United States Patent [19]

Shiraki

[11] Patent Number: 5,197,100
[45] Date of Patent: Mar. 23, 1993

[54] AUDIO CIRCUIT FOR A TELEVISION RECEIVER WITH CENTRAL SPEAKER PRODUCING ONLY HUMAN VOICE SOUND

[75] Inventor: Takeshi Shiraki, Yokohama, Japan

[73] Assignee: Hitachi, Ltd., Tokyo, Japan

[21] Appl. No.: 655,046

[22] Filed: Feb. 14, 1991

[30] Foreign Application Priority Data

Feb. 14, 1990 [JP] Japan ................................. 2-31618

[51] Int. Cl.⁵ ............................................ H04N 5/60
[52] U.S. Cl. ..................................... 381/27; 358/198; 358/254; 381/24
[58] Field of Search ............... 358/198, 254; 381/24, 381/27

[56] References Cited

U.S. PATENT DOCUMENTS

| | | | |
|---|---|---|---|
| 3,126,455 | 3/1964 | Golonski et al. | 381/27 |
| 4,024,344 | 5/1977 | Dolby et al. | 381/27 |
| 4,408,095 | 10/1983 | Ariga et al. | 381/24 |
| 4,516,257 | 5/1985 | Torick | 381/27 |
| 4,953,213 | 8/1990 | Tasaki et al. | 381/24 |
| 4,980,915 | 12/1990 | Ishikawa | 381/27 |

FOREIGN PATENT DOCUMENTS

| | | | |
|---|---|---|---|
| 3145213 | 5/1983 | Denmark | 381/27 |
| 0321045 | 6/1989 | European Pat. Off. | |
| 57-141190 | 9/1982 | Japan . | |
| 60-57789 | 4/1985 | Japan . | |
| 1-132290 | 5/1989 | Japan . | |

Primary Examiner—James J. Groody
Assistant Examiner—Jeffrey S. Murrell
Attorney, Agent, or Firm—Antonelli, Terry, Stout & Kraus

[57] ABSTRACT

An audio circuit for a television receiver wherein a left-hand speaker is disposed on a left side of a screen of a television receiver, a right-hand speaker is disposed on a right side of the screen, and a central speaker is disposed above and below the screen, or wherein an audio signal accompanies a picture to be displayed on the screen. The audio circuit supplies the audio signal to the left-hand, right-hand and central speakers to produce sound including a frequency component extraction circuit for extracting predetermined frequency components of human voice from the audio signal and for supplying an extracted signal of the human voice frequency components to the central speaker so that the central speaker produces only human voice sound.

11 Claims, 4 Drawing Sheets

L, R

FIG. 3A
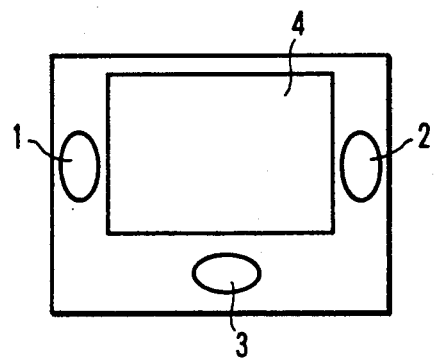
FIG. 3B
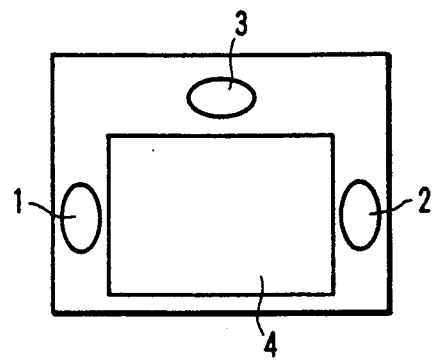
FIG. 4
| MODE | LEFT/RIGHT SPEAKERS | CENTRAL SPEAKER |
|---|---|---|
| NARRATION | LARGE HIGH/LOW FREQUENCY COMPONENT OUTPUTS<br>- - - - - - - - - - - - - - - - - - - - - - - -<br>SMALL VOICE COMPONENT OUTPUT | LARGE OUTPUT |
| MUSIC | LARGE OUTPUT | NO OUTPUT |
| THEATRE | LARGE LOW/HIGH FREQUENCY COMPONENT OUTPUTS<br>- - - - - - - - - - - - - - - - - - - - - - - -<br>MEDIUM VOICE COMPONENT OUTPUT | MEDIUM OUTPUT |

AUDIO CIRCUIT FOR A TELEVISION RECEIVER WITH CENTRAL SPEAKER PRODUCING ONLY HUMAN VOICE SOUND

BACKGROUND OF THE INVENTION

The present invention relates to an audio circuit for a television receiver, and more particularly to an audio circuit for a television receiver based on a three-speaker system in which a left-hand speaker is disposed on the left side of the screen of the television receiver, a right-hand speaker is disposed on the right side of the screen, and a central speaker is disposed above or below the screen.

Among recent television receivers intended to reproduce the field of sound, some are designed to vary the frequency characteristics of the audio circuit in response to the content of the audio signal (e.g., a program mainly containing human voice, a program of music, or a program of cinema) or designed to have two or more speakers to form a multiple speaker system. One example is the "Dolby Pro Logic Sound System" described in an article entitled "Sanyo Dolby Pro Logic Sound Decoder IC" in "Television Technology", pp. 31–36, October, 1988. This system includes three speakers located on the left (L), right (R), and at the center (C) of the screen (for producing a total component of the left and right outputs), and further includes a surround speaker (S) at the rear of the audience (for producing a differential component of the left and right outputs). The system emphasizes the sound source positions and sound directions by producing the sound of a major signal at a highest power on the basis of comparison among the signals (L, R, C, S) delivered to the respective speakers. The system also includes an operational mode which involves only the left, right and central speakers, although the sound effect is degraded.

It is also known to have R, L and C speakers for a television receiver where the C speaker provides only a low frequency output of the signals applied to the L and R speakers in the range of 30–170 Hz, thereby providing a bass emphasis at the C speaker.

Although the foregoing systems are effective for clarifying the sound source positions and directions and the movement of sound, such systems lack in the ability of separation of a human voice from other sound such as background music.

Among various sound sources accompanying pictures displayed on the television screen, human voice is most significant in many cases, and emphasis on the human voice relative to background music, for example, is highly effective. Conversely, in the case of a picture displayed on a screen in which no actor is included or an actor is not the major object, the reduction of the frequency components of human voice is highly effective. Conventional systems are deficient with respect to the human voice and the following describes different situations with respect to consideration of the human voice.

In the case of a three-speaker system (left, right and central speakers) for reproducing the field of sound, when an actor speaks at the center of the screen in the presence of background music or the like, if the central speaker produces a sound of the signal which is merely the sum of the left-hand and right-hand speaker signals, both the human voice and music are coincident at the center speaker. In this case, if it is intended to produce a sound of high and low frequency components of music or the like on the left-hand and right-hand speakers, with only a human voice component being produced on the central speaker, a sound of significantly large output must be produced on the central speaker relative to the left and right outputs in order to have a sufficient effect, which results in an excessively large total sound output.

In the case of a program with a minor human voice, if the central speaker is kept active, stereo separation is deteriorated, or if matrix sound is employed to overlay the left-right differential component on the left-hand and right-hand speaker signals, sound other than human voice becomes too large.

SUMMARY OF THE INVENTION

It is an object of the present invention to solve the foregoing prior art deficiencies and provide an audio circuit for a television receiver capable of enhancing the sound effect to match each television program.

It is another object of the present invention to provide an audio circuit for a television receiver having right, left and central speakers wherein human voice sound is produced only at the central speaker.

In order to achieve the above objectives, the present invention provides an audio circuit for a television receiver in which a left-hand speaker is disposed on the left side of the screen of the television receiver, a right-hand speaker is disposed on the right side of the screen, and a central speaker is disposed above or below the screen, with an audio signal accompanying a displayed picture on the screen being supplied to the speakers to produce sound, wherein the audio circuit includes a frequency component extraction circuit which extracts the prescribed frequency components of human voice from the audio signal to be supplied to the speakers and supplies the extracted signal to the central speaker so that the central speaker produces only human voice sound.

The audio circuit in accordance with a feature of the present invention includes a first subtraction circuit which subtracts the frequency components of human voice extracted by the extraction circuit from the audio signal to be supplied to the left-hand speaker and supplies the resulting signal to the left-hand speaker, and a second subtraction circuit which subtracts the frequency components of human voice extracted by the extraction circuit from the audio signal to be supplied to the right-hand speaker and supplies the resulting signal to the right-hand speaker.

According to another feature of the present invention, the audio circuit includes a frequency component extraction circuit which extracts the prescribed frequency components of human voice from the audio signals, a mode switching circuit functioning as a variable-gain amplifying circuit which amplifies the extracted frequency components of human voice and supplies the resulting signal to the central speaker, a first subtraction circuit which subtracts the output signal of the mode switching circuit from the audio signal to be supplied to the left-hand speaker and supplies the resulting signal to the left-hand speaker, and a second subtraction circuit which subtracts the output signal of the mode switching circuit from the audio signal to be supplied to the right-hand speaker and supplies the resulting signal to the right-hand speaker.

Through the provision of the frequency component extraction circuit which extracts the frequency components of human voice from the audio signal for a displayed picture on the screen and supplies the extracted signal to the central speaker, it is possible to produce only sound of human voice on the central speaker, so that the human voice is emphasized when it is the major sound source of the displayed picture. Furthermore, through the provision of a first subtraction circuit which subtracts the frequency components of human voice extracted by the extraction circuit from the audio signal to be supplied to the left-hand speaker and which supplies the resulting signal to the left-hand speaker, and a second subtraction circuit which subtracts the frequency components of human voice extracted by the extraction circuit from the audio signal to be supplied to the right-hand speaker and which supplies the resulting signal to the right-hand speaker, it is possible to produce only sound of human voice on the central speaker and produce the remaining sound such as music on the left-hand and right-hand speakers.

Additionally, in accordance with the features of the present invention, through the provision of the frequency component extraction circuit which extracts the prescribed frequency components of human voice from the audio signals for a displayed picture, a mode switching circuit functioning as a variable-gain amplifying circuit which amplifies the extracted frequency components of human voice and supplies the resulting signal to the central speaker, a first subtraction circuit which subtracts the output signal of the mode switching circuit from the audio signal to be supplied to the left-hand speaker and supplies the resulting signal to the left-hand speaker, and a second subtraction circuit which subtracts the output signal of the mode switching circuit from the audio signal to be supplied to the right-hand speaker and supplies the resulting signal to the right-hand speaker, it is possible to operate on the mode switching circuit to have an amplification gain increased during a narration mode of the audio signal accompanying the displayed picture, to have the amplification gain decreased to zero during a music mode of the audio signal, or to have the amplification gain set to an intermediate point during a theater mode of the audio signal.

The audio circuit in accordance with the present invention has the capability of matrix sound, in which case, an excess of background sound relative to human voice sound is alleviated by producing the sound of human voice on the central speaker in the theater mode.

These and other objects, features and advantages of the present invention will become more obvious from the following description when taken in connection with the accompanying drawings which show for purposes of illustration only, several embodiments in accordance with the present invention.

BRIEF DESCRIPTION OF THE DRAWINGS

FIGS. 3A-3B show external front views of speaker arrangements of a television receiver in accordance with the present invention;

FIG. 4 is a table showing different speaker outputs for operational modes in accordance with the present invention.

DETAILED DESCRIPTION OF THE PREFERRED EMBODIMENTS

Figure 1:
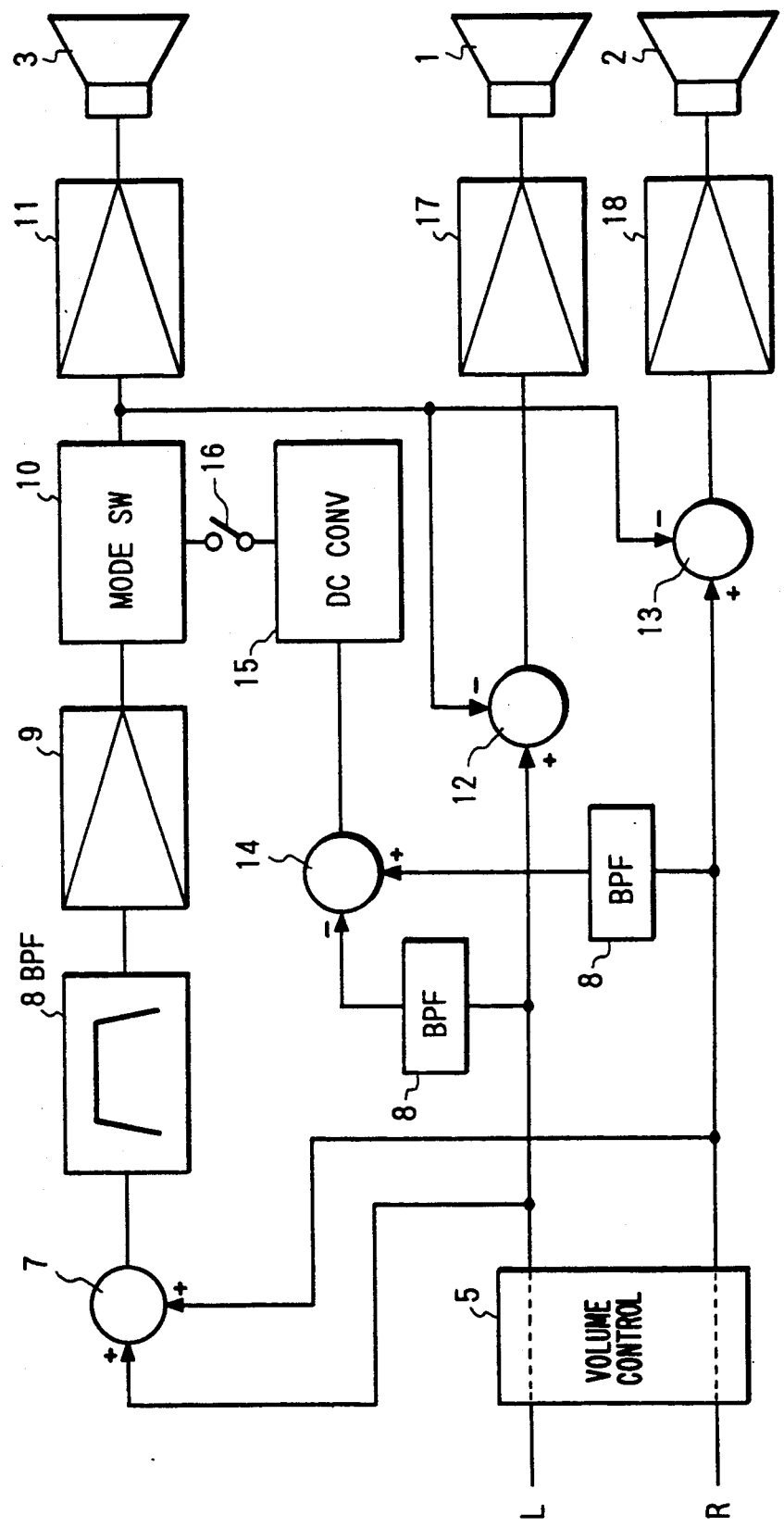
FIG. 1 is a block diagram showing the circuit arrangement of an embodiment of the present invention.

Referring now to the drawings wherein like reference numerals are utilized to designate like parts throughout the several views, FIGS. 3A and 3B show front views of a television receiver in accordance with the present invention. In FIG. 3A, there is illustrated a left-hand speaker 1, a right-hand speaker 2 and a central speaker disposed on the left, right and center positions, respectively, with respect to a CRT screen 4 of the television receiver. More particularly, FIG. 3A shows an embodiment in which the central speaker 3 is located in the central position below the screen 4, whereas FIG. 3B shows an embodiment in which the central speaker 3 is located in the central position above the screen.

FIG. 1 is a block diagram showing a circuit arrangement of an embodiment of the present invention including the left-hand speaker 1, the right-hand speaker 2, and the central speaker 3, whether positioned above or below the screen. A left signal L and a right signal R are subjected to volume-control by a volume control circuit 5, and the volume controlled signals are summed by an addition circuit 7. The left signal L and the right signal R may be either stereo signals or monaural signals. The addition circuit 7 provides the output thereof to a band-pass filter (BPF) 8, by which the frequency components of human voice (about 200 Hz to 5 kHz) are extracted. The characteristics of the band-pass filter 8 is determined in consideration that the passage of higher frequency components creates a hard sound, while the passage of lower frequency components creates a vague sound.

The extracted voice frequency components are amplified by an amplifier 9 and, after being fed through a mode switching circuit 10, the operation of which will be described later, and another amplifier 11 are supplied to the central speaker 3. The left signal L and the right signal R which have been volume-controlled by the control circuit 5 are subjected to subtraction by the voice frequency components (about 200 Hz to 5 kHz) for the central speaker 3 by respective subtraction circuits 12 and 13 receiving the output of the mode switching circuit 10, and, after amplification by respective amplifiers 14 and 15, the output signals of the amplifiers are supplied respectively to the left-hand speaker 1 and right-hand speaker 2.

Figure 2A:
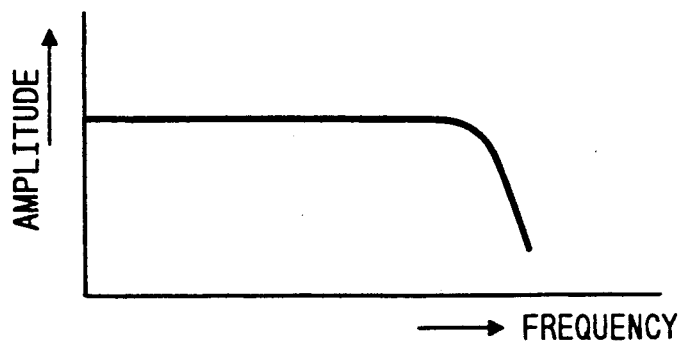
FIGS. 2A-2C show frequency characteristics of signals in various parts of the circuit in FIG. 1.
Figure 2B:
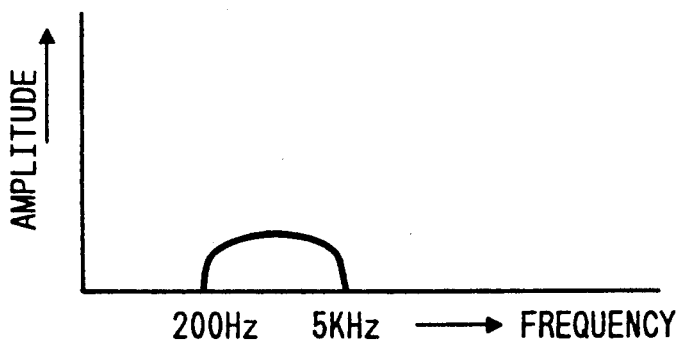
Figure 2C:
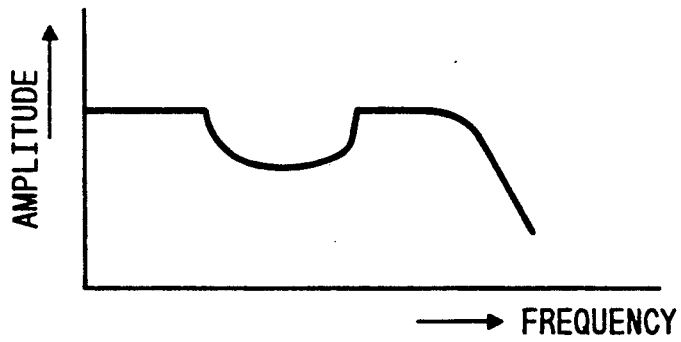

FIG. 2 shows the frequency response of the signals in the circuit of FIG. 1. The left signal L and the right signal R produced at the control circuit 5 have a virtually flat frequency response as shown in FIG. 2A. FIG. 2B shows the frequency response of the band-pass filter (BPF) 8, which extracts the human voice frequency components (about 200 Hz to 5 kHz). Accordingly, the signals processed through the subtraction circuits 12 and 13 and the amplifiers 14 and 15 and supplied to the left-hand speaker 1 and the right-hand speaker 2 have a frequency response as shown in FIG. 2C. Consequently, the central speaker 3 produces human voice sound while the left-hand speaker 1 and right-hand speaker 2 produce music or sounds other than human voice, thereby providing a good sound effect particularly for a program in which the human voice is the major sound source.

The operation of the mode switching circuit 10 in FIG. 1 will be described with reference to FIG. 4 which is a table of operational modes selected by the mode switching circuit 10. In FIG. 1, the mode switching circuit 10 is a variable-gain amplifying circuit. Setting of a large gain on the mode switching circuit 10 corresponds to the narration mode in FIG. 4 (this mode is suitable for a program in which the human voice is the major sound source). By setting a large gain on the mode switching circuit 10, the human voice sound produced by the central speaker 3 increases, and the human voice sound produced by the left-hand speaker 1 and right-hand speaker 2 decreases as a result of subtraction by the subtraction circuits 12 and 13, with the lower and higher frequency components excluding the human voice components being emphasized (as shown in FIG. 2C).

In FIG. 1, setting of the gain on the mode switching circuit 10 to zero corresponds to the music mode in FIG. 4 (this mode is suitable for a musical program which does not include human voice). By setting a zero-gain on the mode switching circuit 10, the central speaker 3 produces no sound, and the left-hand speaker 1 and the right-hand speaker 2 produce increased sounds, which is suitable for a stereo program.

Next, in FIG. 1, setting of the gain of the mode switching circuit 10 to an intermediate point corresponds to the theater mode in FIG. 4 (this mode is suitable for a program which includes human speech, songs and effective background music, as in a cinema). By setting a moderate or intermediate gain on the mode switching circuit 10, the central speaker 3 produces a human voice sound which is also heard from the left-hand speaker 1 and the right-hand speaker 2 to some extent, and with lower and higher frequency components being emphasized.

The table of operational modes in FIG. 4 may further include a standard mode which is achieved through a proper setting of the gain on the mode switching circuit 10.

In FIG. 1, the setting of the appropriate mode of the mode switching circuit 10 may be achieved by manual control or by closing of the switch 16 whereby the left and right signals from the output of the volume control circuit 5 are respectively subjected to band-pass filtering in other band-pass filters 8 and then supplied to a subtractor circuit 14. The output of the subtractor circuit 14 is supplied to a DC converter circuit which provides an output of an appropriate level via switch 16 to the variable gain amplifying circuit for automatically setting the gain and therewith the mode in accordance with the frequency components L and R signals.

Figure 5:
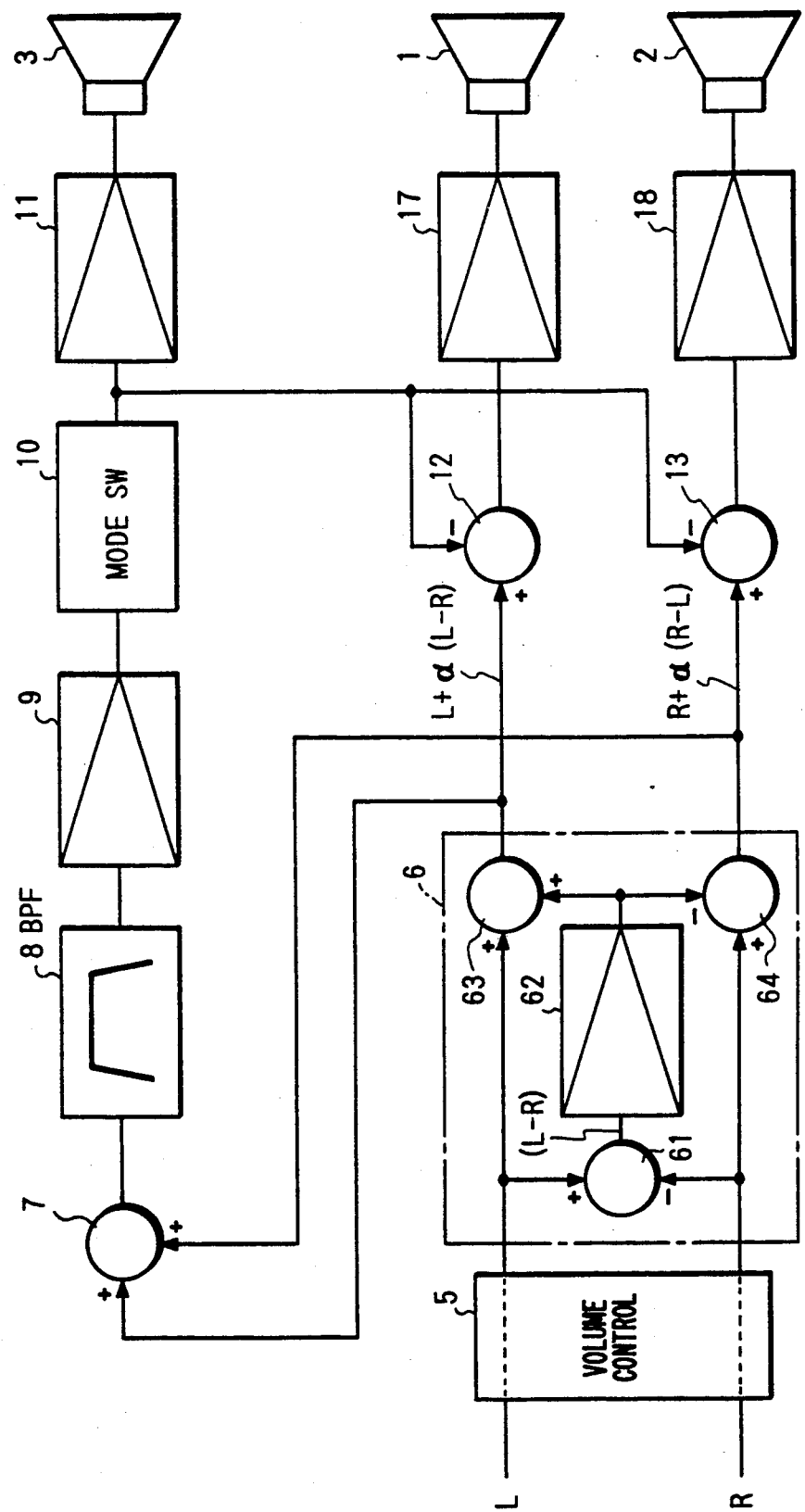
FIG. 5 is a block diagram showing the circuit arrangement of another embodiment of the present invention.

FIG. 5 is a block diagram showing another embodiment of the present invention. This embodiment differs from that of FIG. 1 in the additional provision of a matrix sound circuit 6. In the matrix sound circuit 6 of FIG. 5, a subtraction circuit 61 produces an L-R signal which is amplified by an amplifying circuit 62 (with a gain of $\alpha$ and the (L-R) signal is added to the L signal by an addition circuit 63 to produce an L+$\alpha$(L-R) signal having a sound effect. Similarly, a subtraction circuit 64 performs subtraction of the $\alpha$(L-R) signal from the R signal to produce an R+$\alpha$(R-L) signal. The remaining circuit arrangement and operation are identical to the embodiment of FIG. 1, noting that the automatic mode switching arrangement of FIG. 1 is not illustrated in this embodiment, but may be utilized therewith.

According to the present invention, the central speaker produces only human voice sound, so that speech is heard from the center of the screen and background music, if it is present, is heard from the left and right, whereby the directivity of sound is made to match the content of each program. The above-mentioned effectiveness is accomplished without changing the total sound volume, even though the central speaker produces a human voice sound. Through the selection of an operational mode depending on the content of the screen program thereby to set a proper output of the central speaker, it is possible to provide the directivity of sound which is optimal for the content of each program. Moreover, in the performance of matrix sound, in which the differential component L-R of the left and right signals is superimposed on the L and R signals, the human voice sound is prevented from being lost, and the sound effect in the theater mode can be enhanced.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. An audio circuit for a television receiver wherein a left-hand speaker is disposed on a left side of a screen of a television receiver, a right-hand speaker is disposed on a right side of the screen, and a central speaker is disposed above or below the screen, and wherein an audio signal accompanies a picture to be displayed on the screen, the audio circuit comprising means for supplying the audio signal to the left-hand, right-hand and central speakers to produce sound, the audio signal supplying means including frequency component extraction circuit means for extracting predetermined frequency components of human voice from the audio signal and for supplying an extracted signal of the human voice frequency components to the central speaker so that the central speaker produces only human voice sound, wherein the audio signal supplying means includes mode switching means providing variable-gain amplification for amplifying the extracted frequency components of human voice extracted by the frequency component extraction circuit means and for supplying an output signal thereof to the central speaker, first subtraction circuit means for subtracting the output signal of the mode switching means from the audio signal to be supplied to the left-hand speaker and for supplying a resulting subtracted signal to the left-hand speaker, and a second subtraction circuit means for subtracting the output signal of the mode switching means from the audio signal to be supplied to the right-hand speaker and for supplying a resulting subtracted signal to the right-hand speaker, and wherein the mode switching means providing variable-gain amplification includes means for providing an increased amplification gain during a narration mode of the audio signal accompanying the displayed picture, means for providing an amplification gain which is decreased to zero during a music mode of the audio signal accompanying the displayed picture and means for providing an intermediate amplification gain during a theater mode of the audio signal.

2. An audio circuit according to claim 1, wherein the means for providing the increased, zero and intermediate amplification gain of the mode switching means includes manual control means.

3. An audio circuit according to claim 1, wherein the means for providing the increased, zero and intermediate amplification gain of the mode switching means includes automatic control means.

4. An audio circuit according to claim 4, wherein the automatic control means includes first means for filtering the audio signal to be supplied to the left-hand signal and providing an output indicative thereof, second means for filtering the audio signal to be supplied to the right-hand speaker and providing and output indicative thereof, subtraction means for subtracting one of the outputs from the first and second filtering means from the other of the outputs from the first and second filtering means and providing a subtraction output, and DC converter means for converting the subtraction output to a value for controlling the mode switching means in accordance therewith.

5. An audio circuit according to claim 1, wherein the frequency component extraction means includes adder circuit means for adding the audio signal to be supplied to the left-hand speaker to the audio signal to be supplied to the right-hand speaker and for providing a sum output signal and band-pass filtering means for filtering the sum output signal to extract predetermined frequency components of human voice therefrom.

6. An audio circuit according to claim 5, wherein the band-pass filtering means has a band pass filter characteristic in a frequency range of about 200 Hz to 5 kHz.

7. An audio circuit according to claim 5, further comprising third subtraction circuit means for subtracting one of the audio signals to be supplied to the left-hand speaker and to the right-hand speaker from the other of the audio signals to be supplied to the left-hand speaker and to the right-hand speaker and for providing a subtracted output thereof, amplifier means for amplifying the subtracted output by a predetermined gain and for providing an amplified output thereof, fourth subtraction circuit means for subtracting the amplified output from one of the audio signals to be supplied to the left-hand speaker and the right-hand speaker and providing a subtracted output signal as the audio signal to be supplied to one of the left-hand and right-hand speakers, and summing circuit means for summing the amplified output and the other of the audio signals to be the left-hand speaker and the right-hand speaker and for providing a summed output signal as the audio signal to be supplied to the other of the left-hand and right-hand speakers, the adder circuit means of the frequency extraction circuit means receiving the subtracted and summed output signals.

8. An audio circuit according to claim 7, further comprising volume control circuit means for subjecting the audio signals to be supplied to the left-hand and right-hand speakers to volume control and supplying the signals therefrom to the third subtraction circuit means.

9. An audio circuit according to claim 5, wherein the audio signal supplying means includes mode switching means providing variable-gain amplification for amplifying the extracted frequency components of human voice extracted by the frequency component extracting means and providing an amplified output to the first and second subtraction circuit means.

10. An audio ciucit according to claim 9, further comprising volume control circuit means for subjecting the audio signals to be supplied to the left-hand and right-hand speakers to volume control.

11. An audio circuit according to claim 1, further comprising volume control circuit means for subjecting the audio signals to be supplied to the left-hand and right-hand speakers to volume control and supplying the signals therefrom to the frequency extraction circuit means.

* * * * *